R. S. HIGINBOTHAM.
Levelling Instruments.

No. 151,488.  Patented June 2, 1874.

Witnesses.
A. Ruppert
N. Bradford

Inventor:
R. S. Higinbotham

UNITED STATES PATENT OFFICE.

ROBERT S. HIGINBOTHAM, OF CHARLESTON, ILLINOIS.

IMPROVEMENT IN LEVELING-INSTRUMENTS.

Specification forming part of Letters Patent No. 151,488, dated June 2, 1874; application filed May 26, 1873.

*To all whom it may concern:*

Figure 1:
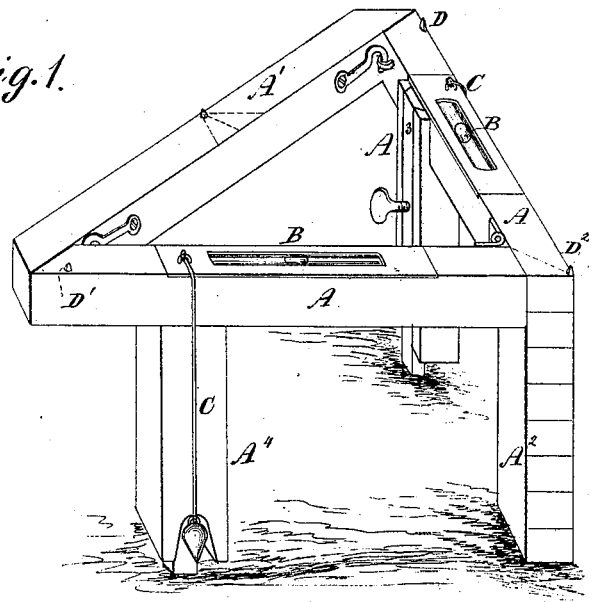
Figure 3:
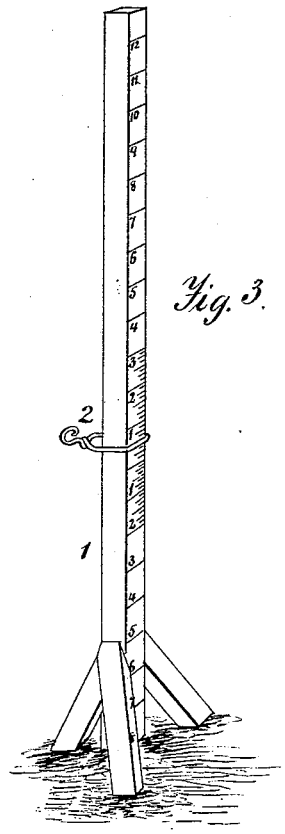
Figure 2:
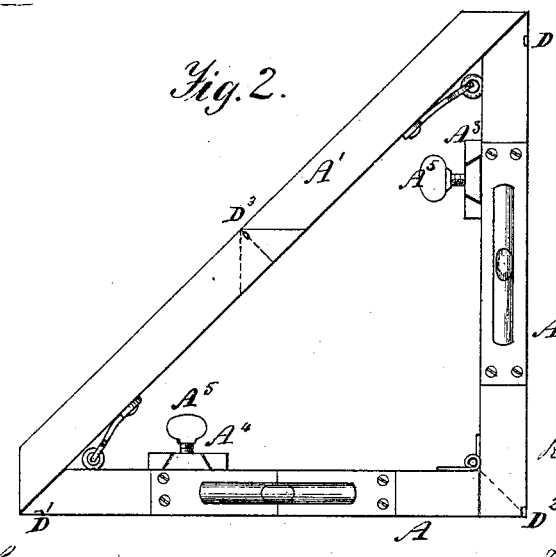

Be it known that I, ROBERT S. HIGINBOTHAM, of Charleston, in the county of Coles and State of Illinois, have invented certain new and useful Improvements in Triangular Folding Levels, of which the following is a specification:

Figure 1 is a perspective view of my improved level, showing the parts in position for use. Fig. 2 is a plan view, showing the construction of the instrument, and how it may be folded up for transportation; and Fig. 3 is a perspective view of a target which is to be used in connection with the level.

Corresponding letters denote corresponding parts in the several figures.

This invention relates to a level which is designed to be used in leveling the foundations for buildings, and also for determining the location of the corners of the same; and it consists in a triangular frame of any suitable substance, which is provided with means for leveling the same, and with sights properly arranged for determining the position of the corners of a building, except the first one, without moving the instrument; and it consists, secondly, in a target or tripod, to be used in combination with the level to aid in determining locations and levels, as will be more fully explained hereinafter.

In constructing instruments of this character, I use a frame, A, of any suitable material, either wood or metal, and in order to make it serviceable for establishing all of the corners of a building, after the location of the first one has been determined upon, and that the levels of such corners may be fixed, I prefer to make it in the form of a right-angled triangle, as shown; and in order that the instrument may be conveniently arranged for transportation from place to place, I prefer to make it capable of being folded up by removing the long bar $A^1$, and providing a hinge at the junction of the short ones A A, so arranged that they can be folded upon each other. The instrument may, however, be constructed and used, if preferred, without these last-named provisions. At or near the junction of the bars A A there is placed a leg, $A^2$, which serves as a support for that portion of the instrument, it being of any required length, and graduated by a scale, as shown in Fig. 1. Near the outer ends of the portions A A of the frame, legs $A^3$ and $A^4$ are provided, which have formed in them grooves, into which are fitted sliding pieces of wood or metal, which are adjustable vertically, for the purpose of enabling the operator to level the instrument, said sliding pieces being held in position by means of set-screws $A^5$, or in any other convenient manner. In the upper surface of the posts A A of the frame, grooves or recesses are formed for the reception of tubes B B, of glass, filled partially with spirits, or any substance that will readily indicate when the instrument is level. As a further means of giving an indication of the correctness of the position, or adjustment of the instrument, it is proposed to use a plumb and line, as shown at C C in Fig. 1. In order that the sight of the operator may be properly directed across the instrument and to the target, in locating the corners of a building, and in building the same, sights D $D^1$ are placed in the outer ends of the portions A A of the frame, and another, $D^2$, is placed upon the frame at the outer point of the right-angled portion thereof, so that the fourth corner of the foundation may be determined and beveled without moving the instrument. In order that this last-named result may be fully accomplished, another sight, $D^3$, is placed in the center of the subtense-bar $A^1$ of the frame.

Having described the instrument which is to be employed in leveling, I will now proceed to describe the target which is to be used in connection with it: This target is shown in Fig. 3, and consists of a graduated vertical rod or bar, 1, having at its lower end legs or feet for supporting it in a vertical position. The graduations upon the side of the bar may be made to represent feet and inches, and, if desired, any fractional parts thereof, so that the sliding loop or band 2, which is made to move up or down upon it, may be set at any desired distance from the upper or lower end of the bar, and there held in position until a note is taken of such position.

The operation of this instrument will be as follows: The position of one corner of a building having been determined upon, the leg $A^2$ thereof is placed in such position, and the slides in the other legs are moved until the leveling-tubes or the plumb-lines indicate that the instrument is level, at which time the operator sends some person in the direction in which he desires to have the building extend, and to a point just beyond where it is to terminate, where he plants the target, when, by looking along the sights on the frame, its location can be accurately determined, when lines may be drawn or stakes driven so soon as the required distance has been measured off. After this has been accomplished, and it is desired to determine another corner, it is only necessary to move the target and for the operator to look along the sights on the other right-angle bar of the frame to the distance which he desires to extend the building or its foundations in that direction, and order the target placed in the proper position, when a second corner will be established, after which the remaining one can be fixed by the sights at the right-angled corner of the instrument and the one in the subtense-bar $A^1$, the target being used as before.

The above description relates to determining the points at which the corners of the foundation are to be placed; but the instrument is capable of further use in determining the level of all parts of the foundation, and this is effected by placing it upon any finished portion thereof and the target upon any other portion, and sighting along the graduated leg of the instrument to a point on the target-rod which indicates the same distance from its lower end as that of the line along which the sight is directed over the leg of the instrument.

Having thus described my invention, what I claim, and desire to secure by Letters Patent, is—

1. A right-angled triangular leveling-instrument having fixed and adjustable legs, spirit-levels in its upper surface, and sights for determining the points at which a target should be set.

2. The combination, in a leveling-instrument, such as herein described, of the removable subtense-bar $A^1$ and the folding bars A A, they being arranged substantially as and for the purpose specified.

In testimony whereof I have signed my name to this specification in the presence of two subscribing witnesses.

R. S. HIGINBOTHAM.

Witnesses:
C. F. Cox,
Jas. M. Hodgen.